United States Patent
Kusaka et al.

(10) Patent No.: US 12,256,160 B2
(45) Date of Patent: Mar. 18, 2025

(54) IMAGING DEVICE, IMAGING METHOD, AND METHOD FOR PRODUCING THE IMAGING DEVICE

(71) Applicant: Fujikura Ltd., Tokyo (JP)

(72) Inventors: Hiroyuki Kusaka, Tokyo (JP); Masahiro Kashiwagi, Tokyo (JP); Yuichiro Kunai, Tokyo (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 18/001,265

(22) PCT Filed: Jan. 18, 2022

(86) PCT No.: PCT/JP2022/001527
§ 371 (c)(1),
(2) Date: Dec. 9, 2022

(87) PCT Pub. No.: WO2023/139629
PCT Pub. Date: Jul. 27, 2023

(65) Prior Publication Data
US 2024/0236513 A1    Jul. 11, 2024

(51) Int. Cl.
*H04N 23/95* (2023.01)
*H04N 23/80* (2023.01)
*H04N 25/40* (2023.01)

(52) U.S. Cl.
CPC .......... *H04N 23/95* (2023.01); *H04N 23/815* (2023.01); *H04N 25/41* (2023.01)

(58) Field of Classification Search
CPC ....... H04N 23/95; H04N 23/815; H04N 25/41
See application file for complete search history.

(56) References Cited

U.S. PATENT DOCUMENTS

| 4,314,151 A * | 2/1982 | Suzuki | G02B 7/38 |
| | | | 250/204 |
| 11,605,171 B1 * | 3/2023 | Hillman | G06T 3/4007 |

(Continued)

FOREIGN PATENT DOCUMENTS

| JP | 2019-176214 A | 10/2019 |
| JP | 2020-086357 A | 6/2020 |

(Continued)

OTHER PUBLICATIONS

International Search Report issued in corresponding International Application No. PCT/JP2022/001527 issued Apr. 12, 2022 (2 pages).
Written Opinion issued in corresponding International Application No. PCT/JP2022/001527 issued Apr. 12, 2022 (4 bages).

(Continued)

*Primary Examiner* — Hung H Lam
(74) *Attorney, Agent, or Firm* — Osha Bergman Watanabe & Burton LLP

(57) ABSTRACT

An imaging device includes: an optical computing section that receives a first optical signal and generates a second optical signal including a feature amount extracted from the first optical signal; an image sensor that converts the second optical signal into a first electric signal including a piece of image information; and a computer that receives the first electric signal and generates second electric signals using machine learning models, each of the second electric signals corresponding to a respective one of the machine learning models, wherein: each of the second electric signals, generated from the first electric signal including the same piece of image information, includes different image information.

10 Claims, 4 Drawing Sheets

(56) References Cited

U.S. PATENT DOCUMENTS

| | | | | |
|---|---|---|---|---|
| 2002/0140841 | A1* | 10/2002 | Sasaki | H04N 23/673 348/E5.045 |
| 2014/0253781 | A1 | 9/2014 | Gill et al. | |
| 2019/0146305 | A1* | 5/2019 | Xin | G02F 1/116 349/33 |
| 2019/0222813 | A1* | 7/2019 | Kane | H04N 23/16 |
| 2021/0294085 | A1* | 9/2021 | Dowaki | G02B 21/0076 |
| 2022/0253978 | A1* | 8/2022 | Park | G06T 3/4053 |

FOREIGN PATENT DOCUMENTS

| | | |
|---|---|---|
| WO | 2004/077819 A1 | 9/2004 |
| WO | 2019/078340 A1 | 4/2019 |

OTHER PUBLICATIONS

English translation of Written Opinion issued in corresponding International Application No. PCT/JP2022/001527 issued Apr. 12, 2022 (4 pages).

Geochang Wu et al., "Light Field Image Processing: An Overview" IEEE Journal of Selected Topics in Signal Processing, vol. 11, No. 7, Oct. 31, 2017, pp. 926-954 (29 pages).

Vincent Sitzmann et al., "End-to-end Optimization of Optics and Image Processing for Achromatic Extended Depth of Field and Super-resolution Imaging" ACM Transactions On Graphics, vol. 37, No. 4, Jul. 30, 2018, pges 1-13 (13 pages).

Jorge Bacca et al., "Deep Coded Aperture Design: An End-to-End Approach for Computational Imaging Tasks" IEEE Transactions On Computational Imaging, vol. 7, Oct. 26, 2021, pp. 1148-1160 (13 pages).

* cited by examiner

IMAGING DEVICE, IMAGING METHOD, AND METHOD FOR PRODUCING THE IMAGING DEVICE

BACKGROUND

Technical Field

The present invention relates to an imaging device and an imaging method for generating an electric signal indicative of an image with use of optical computing, and a method for producing the imaging device.

Description of the Related Art

An imaging device including an optical system constituted by a plurality of lenses (see, for example, Patent Literature 1) and an image sensor typified by, for example, a charge coupled device (CCD) and a complementary metal oxide semiconductor (CMOS) is widely used. Examples of such an imaging device include a digital still camera and a digital video camera.

Most of these imaging devices that are commercially available are of the type called camcorders in which an image sensor and a storage section are integrated with each other. However, some of the imaging devices are of the type, such as endoscopes used in medical practice, in which the image sensor and the storage section are separated from each other.

The optical system of such an imaging device is configured to form an image of a subject on a light receiving surface of an image sensor. Such a configuration of the optical system allows the image sensor to generate an electric signal indicative of an image that focuses on the subject.

PATENT LITERATURE

Patent Literature 1: JP No. 2020-086357

However, an imaging device that forms an image of a subject on a light receiving surface with use of an optical system captures a new image of the subject every time the imaging device generates an electric signal indicative of a different image. Thus, it is difficult for the imaging device to generate electric signals indicative of different images fast or frequently. Examples of the different images include images captured at different angles of view, images having different resolutions, and images having different focal depths (images differing in point of focus).

SUMMARY

An imaging device and an imaging method according to one or more embodiments can generate, from an electric signal including one and the same piece of image information, an electric signal including different image information.

An imaging device in accordance with one or more embodiments includes: an optical computing section configured to perform optical computing with respect to a first optical signal (receive a first optical signal) to generate a second optical signal including a feature amount extracted from the first optical signal; an image sensor configured to convert the second optical signal into a first electric signal; and an electric computing section (a computer) configured to perform electric computing with respect to the first electric signal (receive the first electric signal) to generate a second electric signal. The present imaging device employs a configuration such that the electric computing section has a plurality of models for each generating the second electric signal from the first electric signal, and the second electric signal generated through the electric computing performed with respect to the first electric signal including one and the same piece of image information with use of each of the models includes different image information.

An imaging method in accordance with one or more embodiments includes: an optical computing step of performing optical computing with respect to a first optical signal to generate a second optical signal including a feature amount extracted from the first optical signal; a converting step of converting the second optical signal into a first electric signal; and an electric computing step of performing electric computing with respect to the first electric signal to generate a second electric signal. The present imaging method employs a configuration such that the electric computing step is achieved with use of a plurality of models for each generating the second electric signal from the first electric signal, and the second electric signal generated through the electric computing performed with respect to the first electric signal with use of each of the models includes different image information.

A method for producing an imaging device in accordance with one or more embodiments is a method for producing an imaging device described above, the method including a step of designing the optical computing section and the plurality of models by machine learning so that, in a case where electric computing has been performed with respect to the first electric signal with use of each of the models, the second electric signal including different image information is generated.

According to one or more embodiments, it is possible to achieve an imaging device and an imaging method that are able to generate, from an electric signal including one and the same piece of image information, an electric signal including different image information, and a method for producing the imaging device.

DESCRIPTION OF THE EMBODIMENTS

Configuration of Imaging Device

Figure 1:
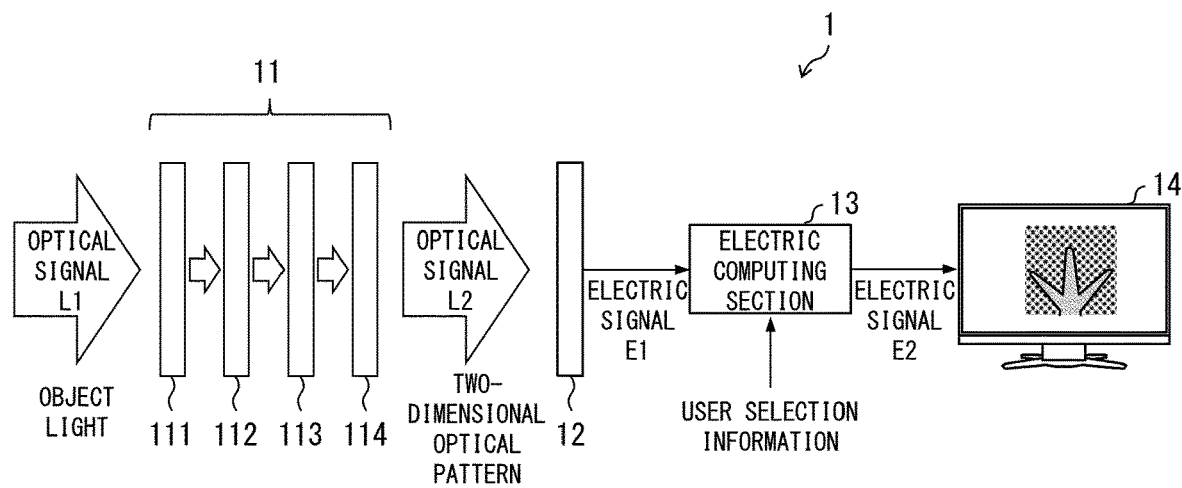
FIG. 1 is a schematic view illustrating a configuration of an imaging device in accordance with one or more embodiments.
Figure 2:
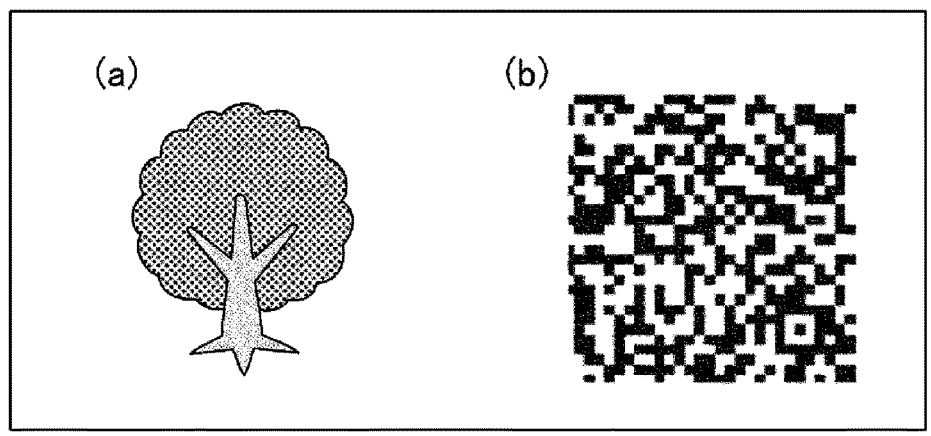
FIG. 2 is a view illustrating an elevation view illustrating a tree that is an example of a subject and a view illustrating an example of a second optical signal that an optical computing section of an imaging device illustrated in FIG. 1 generates.
Figure 3:
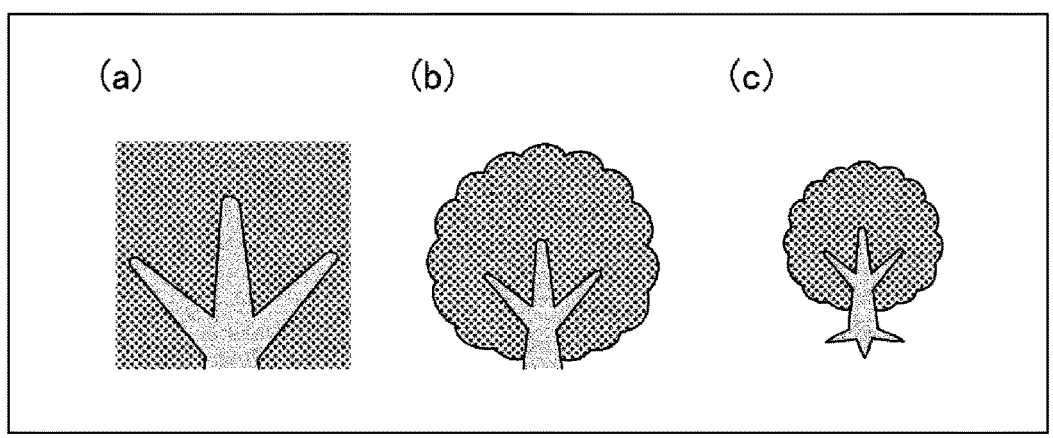
FIG. 3 is a view illustrating an example of an image indicated by each of second electric signals that an electric computing section of an imaging device illustrated in FIG. 1 generates.

The following will describe an imaging device 1 in accordance with one or more embodiments with reference to FIGS. 1 to 3. FIG. 1 is a schematic view illustrating a configuration of an imaging device 1. (a) of FIG. 2 is an elevation view illustrating a tree that is an example of a subject. In (b) of FIG. 2, (b) is a view illustrating an example of an optical signal L2 that an optical computing section 11 of the imaging device 1 generates. Each of (a) to (c) of FIG. 3 is a view illustrating an example of an image indicated by each of electric signals E2 that an electric computing section 13 of the imaging device 1 generates.

As illustrated in FIG. 1, the imaging device 1 includes the optical computing section 11, an image sensor 12, the electric computing section 13 (a computer), and a display 14.

Although not illustrated in FIG. 1, the imaging device 1 may further include an optical system that is provided so as to be followed by the optical computing section 11. The optical system includes a plurality of lenses. The optical system causes light transmitted toward the optical computing section 11 to enter, as an optical signal L1, the optical computing section 11. Examples of light transmitted toward the optical computing section 11 include an image of a subject and an image displayed by a display device which is called a display or a monitor. The image of the subject is constituted by object light, which is light reflected and/or scattered by the subject. Note that this optical system is preferably configured such that the image of the subject is not formed on a light receiving surface of an image sensor 12 that will be described later. In other words, the image sensor 12 is preferably disposed such that the image of the subject is not formed on the light receiving surface of the image sensor 12.

In one or more embodiments, the optical computing section 11 includes a plurality of optical modulation elements stacked in order on top of each other. In one or more embodiments, optical modulation elements 111 to 114 are used as the plurality of optical modulation elements. Each optical modulation element 11$i$ is an example of a transmissive optical modulation element. Here, i is any natural number of not less than 1 and not more than n. In one or more embodiments, i=4. A specific example of each optical modulation element 11$i$ will be described later with reference to FIGS. 4 and 5. As illustrated in FIG. 1, a specific optical path on which the optical signal L1 travels is a linear optical path through each optical modulation element 11$i$.

As described above, the optical system may or may not be provided so as to be followed by the optical computing section 11, but in either case, the optical signal L1 (see (a) of FIG. 2) indicative of the image of the subject enters the light receiving surface of the optical computing section 11. The optical signal L1 is an example of a first optical signal.

The optical computing section 11 performs optical computing with respect to the optical signal L1 to generate the optical signal L2 including a feature amount extracted from the optical signal L1. As illustrated in (b) of FIG. 2, an image indicated by the optical signal L2 has a two-dimensional intensity distribution (that is, a two-dimensional optical pattern). An image illustrated in (b) of FIG. 2 is an example of the optical signal L2.

The image sensor 12 converts the optical signal L2 entering a light receiving surface of the image sensor 12 into the electric signal E1. The electric signal E1 is an example of a first electric signal. The image sensor 12 includes a plurality of pixels arranged in a matrix manner. The image sensor 12 detects the intensity of light entering each pixel and generates an electric signal corresponding to the intensity of the light. The image sensor 12 may be a charge coupled device (CCD) or may be a complementary metal oxide semiconductor (CMOS). A form of the image sensor 12 is not particularly limited, but can be selected as appropriate.

In one or more embodiments, a monochrome image sensor is employed as the image sensor 12. Alternatively, a color image sensor may be employed as the image sensor 12.

The electric computing section 13 performs electric computing with respect to the electric signal E1 to generate the electric signal E2. The electric computing section 13 has a plurality of models for each generating, from the electric signal E1, the electric signal E2. The description of one or more embodiments assumes that the electric computing section 13 has first to third models as the plurality of models. However, the number of the models included in the electric computing section 13 is not limited to three, but can be determined as appropriate. The electric computing section 13 may have 10 models or may have 100 models.

The electric computing section 13 performs, with use of the first to third models, electric computing with respect to the electric signal E1 having one and the same piece of image information to generate the electric signals E2 having respectively different pieces of image information, the electric signals E2 being different from each other as illustrated in (a) to (c) of FIG. 3. However, in one or more embodiments, the electric signal E1 may include one and the same piece of image information, and the electric signals E2 may include respectively different pieces of image information. That is, the expression "the electric signal having image information" may be construed as indicating "the electric signal including image information" or "the electric signal indicative of an image".

Note that one or more embodiments also encompass an imaging method performed in the imaging device 1, the method including: an optical computing step of performing optical computing with respect to the optical signal L1 to generate the optical signal L2; a converting step of converting the optical signal L2 into the electric signal E1; and an electric computing step of performing electric computing with respect to the electric signal E1 to generate the electric signal E2. In this imaging method, the electric computing step can be performed with use of a plurality of models (in one or more embodiments, first to third models) for generating, from the electric signal E1, the electric signals E2, and the electric signal E2 generated through the electric computing performed with respect to the electric signal E1 with use of each of the models has different image information.

An image illustrated in (a) of FIG. 3 is an example of an image corresponding to a case where an angle of view of a zoom lens is narrow. An image illustrated in (c) of FIG. 3 is an example of an image corresponding to a case where the angle of view of the zoom lens is wide. An image illustrated in (b) of FIG. 3 is an example of an image corresponding to a case where the angle of view of the zoom lens is intermediate between the angle of view corresponding to the image illustrated in (a) of FIG. 3 and the angle of view corresponding to the image illustrated in (c) of FIG. 3. As illustrated in (a) to (c) of FIG. 3, the electric computing section 13 changes, in this way, a parameter corresponding to the angle of view of the zoom lens to generate, from the electric signal E1 indicative of one and the same image, the electric signals E2 indicative of a plurality of images having different angles of view.

Note that the plurality of images indicated by the electric signals E2 may have respectively different angles of view as illustrated in (a) to (c) of FIG. 3, may have respectively different resolutions, or may have respectively different focal depths. Furthermore, the plurality of images indicated by the electric signals E2 may have respectively different combinations of an angle of view, a resolution, and a focal depth.

In the imaging device 1, the optical computing section 11 and the first to third models are designed by machine learning so that the electric signals E2 indicative of different images are generated in a case where the electric computing has been performed with respect to the electric signal E1 with use of the first to third models.

Note that one or more embodiments encompass a method for producing the imaging device 1, the method including the step of designing the optical computing section 11 and the first to third models by machine learning so that the electric signals E2 having different pieces of image information are generated in a case where the electric computing has been performed on the electric signal E1 with use of the first to third models.

The imaging device 1 is configured to be capable of receiving input from a user with use of a user interface that is not illustrated in FIG. 1. This user interface may be a keyboard, may be a mouse, or may be a touch panel which is provided on a display panel of a display 14 (described later).

A user can use the user interface to input, to the imaging device 1, user selection information indicating which of the first to third models is to be selected.

The electric computing section 13 also can generate the electric signal E2 from the electric signal E1 with use of a model which has been selected by the user from among the first to third models according to the content of the user selection information. FIG. 1 schematically illustrates a case where the user selects the first model from among the first to third models, the electric computing section 13, in response to the user selection information, generates the electric signal E2 from the electric signal E1 with use of the first model, and the image illustrated in (a) of FIG. 3 (image indicated by the electric signal E2) is displayed on the display 14.

In this way, the imaging device 1 performs electric computing with respect to the electric signal E1 indicative of one and the same image to generate, without performing a new image capture, the electric signals E2 indicative of images which differ in at least one of the angle of view, resolution, and focal depth. Thus, the imaging device 1 is suitably used in a case where an image of a certain subject is captured from a predetermined angle, and zoomed-in images of a plurality of predetermined areas in the subject are checked. Examples of the imaging device used in such a way include an endoscope used in medical practice.

The display 14 acquires the electric signal E2 generated by the electric computing section 13 and then displays the image indicated by the electric signal E2. The display 14 may be a liquid crystal display, may be an organic LED display, or may be a plasma display. In addition, the touch panel, which is an example of the above-described user interface, may be provided on the display panel of the display 14.

(Specific Example of Transmissive Optical Modulation Element)

Figure 4:
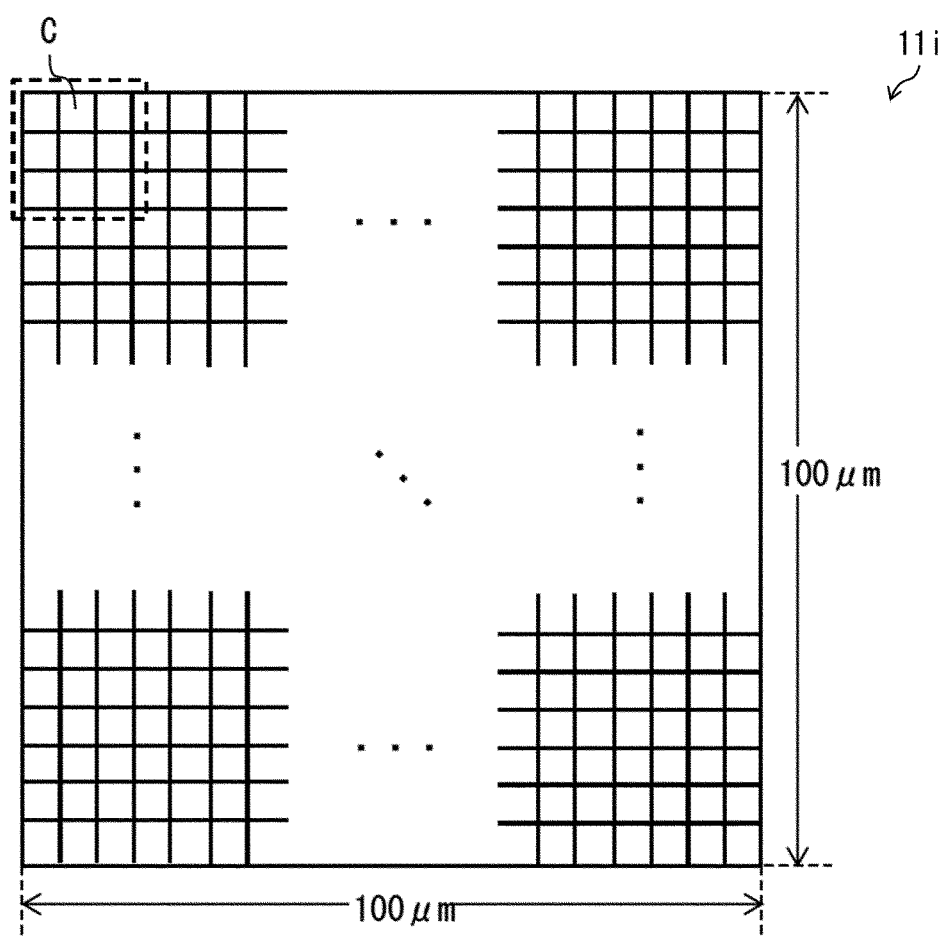
FIG. 4 is a plan view illustrating a specific example of an optical modulation element included in an optical computing section of an imaging device illustrated in FIG. 1.
Figure 5:
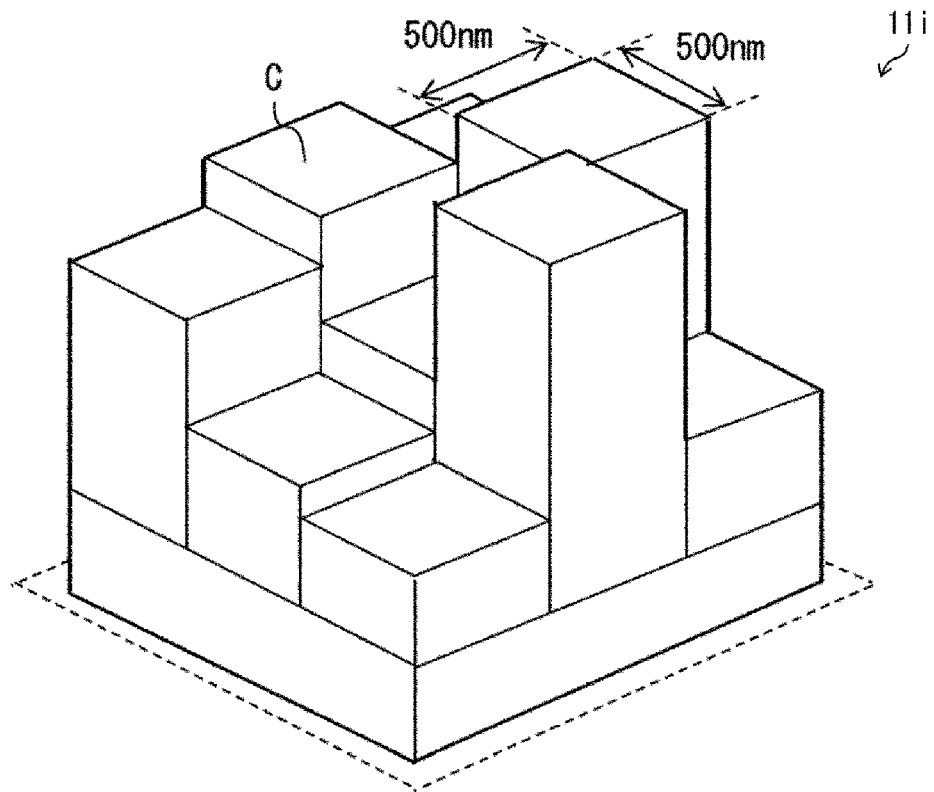
FIG. 5 is a partial enlarged perspective view illustrating an optical modulation element illustrated in FIG. 4.

The following will describe a specific example of an optical modulation element 11$i$ constituting the optical computing section 11, with reference to FIGS. 4 and 5. FIG. 4 is a plan view of the optical modulation element 11$i$ in accordance with the present specific example. FIG. 5 is a partial enlarged perspective view illustrating the optical modulation element 11$i$ in accordance with the present specific example (illustrating a portion enclosed by a dotted line in FIG. 4) in an enlarged manner. The optical modulation element 11$i$ is an example of a transmissive optical modulation element.

As shown in FIG. 2, the optical modulation element 11$i$ is constituted by a plurality of microcells C having phase modulation amounts set independently of each other. When the optical signal L1 enters the optical modulation element 11$i$, resulting optical signals L1 phase-modulated by the microcells C interfere with each other. This achieves a predetermined optical computing (conversion of a two-dimensional intensity distribution in accordance with a predetermined conversion rule). The phase modulation amounts of the microcells C may be variable or may be fixed. In the present specific example, the phase modulation amounts are fixed.

Note that, in the present specification, the "microcell" refers to, for example, a cell having a cell size of less than 10 μm, and the "cell size" refers to a square root of an area of a cell. For example, in a case where the microcell C has a square shape in a plan view, the cell size of the microcell C is a length of a side of the microcell C. The lower limit of the cell size of the microcell C is, for example, 1 nm.

The optical modulation element 11$i$ exemplified in FIG. 4 is constituted by 200×200 microcells C arranged in a matrix manner. Each microcell C has a square shape with a size of 500 nm×500 nm in a plan view, and the optical modulation element 11$i$ has a square shape with a size of 100 μm×100 μm in a plan view.

The phase modulation amount of signal light transmitted through each microcell C can be set for each cell independently by (1) a method in which a thickness of the microcell C is set for each cell independently or (2) a method in which a refractive index of the microcell C is selected for each cell independently. In one or more embodiments, the method (1), which can be achieved by nanoimprinting, is employed. In this case, as illustrated in FIG. 5, each microcell C is constituted by a quadratic prism-shaped pillar having a square bottom surface with four sides that are all equal to the cell size. Furthermore, in this case, the phase modulation amount of the signal light transmitted through each microcell C is determined depending on a height of the pillar constituting the corresponding microcell C. That is, as the height of the pillar constituting the microcell C increases, the phase modulation amount of the signal light transmitted through the microcell C increases, and as the height of the pillar constituting the microcell C decreases, the phase modulation amount of the signal light transmitted through the microcell C decreases.

The setting of the phase modulation amount of each microcell C can be achieved by machine learning. A model used in the machine learning is, for example, a model to which a two-dimensional intensity distribution of the optical signal L1 input to the optical modulation element 11$i$ is input, and from which the two-dimensional intensity distribution of the optical signal L2 output from the optical modulation element 11$i$ is output, the model including the phase modulation amount of each microcell C as a parameter. Here, the two-dimensional intensity distribution of the optical signal L1 input to the optical modulation element $11i$ refers to a set of intensities of signal light beams input to microcells C that constitute the optical modulation element $11i$. Further, the two-dimensional intensity distribution of the optical signal L2 output from the optical modulation element $11i$ refers to a set of intensities of signal light beams input to microcells C that constitute an optical modulation element $11i+1$ which is disposed so as to follow the optical modulation element $11i$ or a set of intensities of signal light beams input to pixels that constitute the image sensor 12 which is disposed so as to follow the optical modulation element $11i$.

(Variation of Imaging Device)

Figure 6:
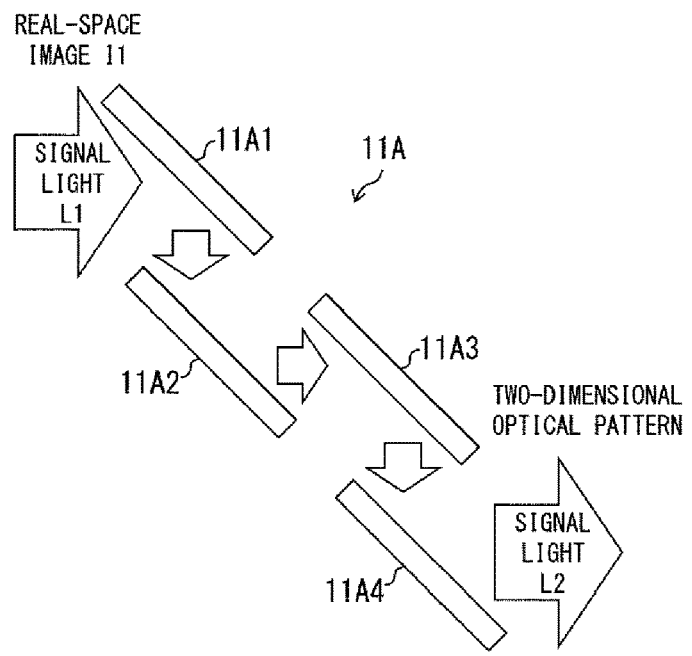
FIG. 6 is a schematic view illustrating a configuration of an optical computing section included in one variation of an imaging device illustrated in FIG. 1.

An imaging device according to a variation of the imaging device 1 will be described with reference to FIG. 6. FIG. 6 is a schematic view illustrating a configuration of an optical computing section 11A included in the imaging device according to the present variation.

The imaging device according to the present variation can be obtained by replacing the optical computing section 11 included in the imaging device 1 illustrated in FIG. 1 with an optical computing section 11A. Thus, in the present variation, the optical computing section 11A will be described, but the image sensor 12, the electric computing section 13, and the display 14 will not be described.

In the above-described specific example of the optical modulation element, the transmissive optical modulation element has been described. However, in one or more embodiments, each optical modulation element included in the optical computing section 11 may be a reflective optical modulation element.

The optical computing section 11A includes a plurality of optical modulation element 11Ai (in the present specific example, optical modulation elements 11A1 to 11A4). Here, i is any natural number of not less than 1 and not more than n. In one or more embodiments, i=4.

The optical modulation element 11Ai, like the optical modulation element $11i$, has an optical computing function, that is, a function of converting the two-dimensional intensity distribution of the optical signal L1 in accordance with a predetermined conversion rule. This allows the two-dimensional intensity distribution of the optical signal L1 reflected by the optical modulation element 11Ai to be converted into the two-dimensional intensity distribution of the optical signal L2. A specific example of the optical modulation element 11Ai will be described later.

In the optical computing section 11A, an optical modulation element 11A1 at a first stage is disposed such that the optical signal L1 enters a reflective surface of the optical modulation element 11A1 at an incident angle of 45 degrees. An optical modulation element 11A2 at a second stage is disposed such that a portion of a reflective surface of the optical modulation element 11A2 faces a portion of the reflective surface of the optical modulation element 11A1, and such that the respective reflective surfaces of the optical modulation elements 11A1 and 11A2 are parallel to each other. An optical signal on which the optical modulation element 11A1 has performed optical computing is emitted from the reflective surface of the optical modulation element 11A1 at an emission angle of 45 degrees. In a similar manner, an optical modulation element 11A3 at a third stage is disposed such that a portion of a reflective surface of the optical modulation element 11A3 faces another portion of the reflective surface of the optical modulation element 11A2, and the respective reflective surfaces of the optical modulation elements 11A2 and 11A3 are parallel to each other. An optical modulation element 11A4 at a fourth stage is disposed such that a portion of a reflective surface of the optical modulation element 11A4 faces another portion of the reflective surface of the optical modulation element 11A3, and the respective reflective surfaces of the optical modulation elements 11A3 and 11A4 are parallel to each other. As illustrated in FIG. 6, a specific optical path on which the optical signal L1 travels is a zigzag optical path passing each optical modulation element 11Ai.

(Specific Example of Reflective Optical Modulation Element)

Figure 7:
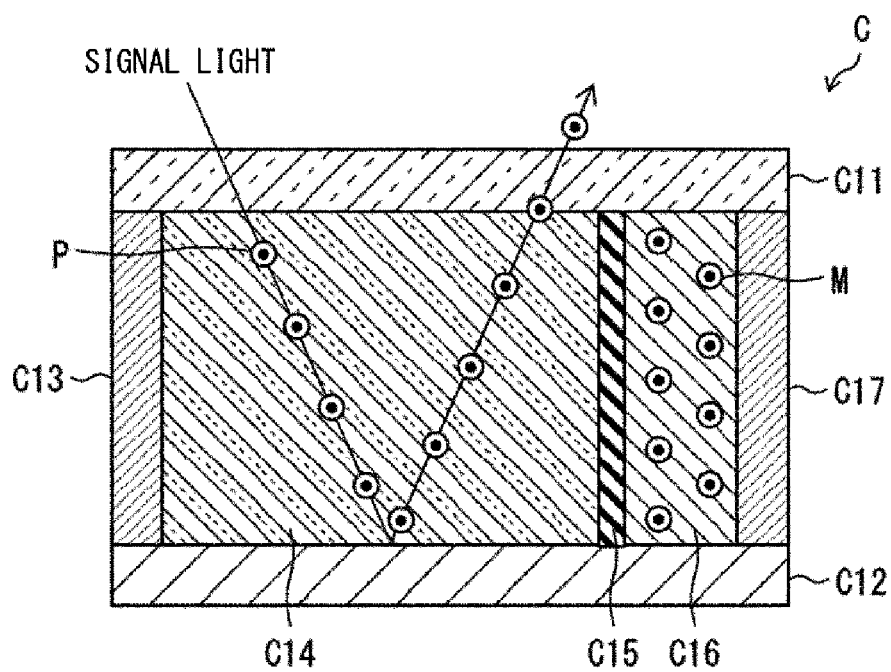
FIG. 7 is a cross-sectional view of a microcell of an optical modulation element included in a specific example of an optical modulation element included in an optical computing section illustrated in FIG. 6.

A specific example of the optical modulation element 11Ai will be described with reference to FIG. 7. FIG. 7 is a cross-sectional view of a microcell C constituting the optical modulation element 11Ai in accordance with the present specific example. The optical modulation element 11Ai is an example of a reflective optical modulation element.

The optical modulation element 11Ai, like the optical modulation element $11i$ illustrated in FIG. 4, includes a plurality of microcells C. In the present specific example, the phase modulation amounts are set for the microcells C independently of each other. When the optical signal L1 enters the optical modulation element 11Ai, resulting signal light beams phase-modulated by the microcells C interfere with each other. This achieves a predetermined optical computing (conversion of the two-dimensional intensity distribution in accordance with a predetermined conversion rule). The phase modulation amounts of the microcells C may be variable or may be fixed. In the present specific example, the phase modulation amounts are variable.

The optical modulation element 11Ai is, as with the optical modulation element $11i$ illustrated in FIG. 4, constituted by 200×200 microcells arranged in a matrix manner. Each microcell has a square shape with a size of 500 nm×500 nm in a plan view. The optical modulation element 11Ai has a square shape with a size of 100 μm×100 μm in a plan view.

For example, as illustrated in FIG. 7, each microcell C constituting the optical modulation element 11Ai may include a polarizing plate C11, a reflecting plate C12, a first electrode C13, a magnetization free layer C14, an insulating layer C15, a magnetization fixed layer C16, and a second electrode C17.

The polarizing plate C11 and the reflecting plate C12 are disposed opposite to each other. The first electrode C13, the magnetization free layer C14, the insulating layer C15, the magnetization fixed layer C16, and the second electrode C17 are stacked in this order, and are sandwiched between the polarizing plate 11 and the reflecting plate 12. Here, a direction in which the first electrode C13, the magnetization free layer C14, the insulating layer C15, the magnetization fixed layer C16, and the second electrode C17 are stacked is orthogonal to a direction in which the polarizing plate C11 and the reflecting plate C12 are stacked. Thus, a first side surface of the magnetization free layer C14 is in surface contact with one main surface of the polarizing plate C11, and a second side surface of the magnetization free layer C14 which is located opposite the first side surface of the magnetization free layer C14 is in surface contact with one main surface of the reflecting plate C12. Signal light L (1) enters an inside of the magnetization free layer C14 through the polarizing plate C11, (2) is reflected by the reflecting plate C12 and (3) is emitted through the polarizing plate C11 to an outside of the magnetization free layer C14.

The magnetization free layer C14 is made of, for example, an electrically conductive, light-transmissive, soft magnetic material (for example, CoFeB). The magnetization fixed layer C16 is made of, for example, an electrically conductive hard magnetic material (for example, permalloy). Selected as the polarizing plate C11 is a polarizing plate that selectively transmits a polarized light component having a polarization direction P parallel to a magnetization direction M of the magnetization fixed layer C16. FIG. 6 exemplifies a case that the magnetization direction M and the polarization direction P are parallel to both a main surface of the polarizing plate C11 and a main surface of the magnetization fixed layer C16.

When a potential difference is provided between the first electrode C13 and the second electrode C17, a tunnel effect occurs and injects a spin flow (a flow of spin-polarized electrons) from the magnetization fixed layer C16 through the insulating layer C15 into the magnetization free layer C14 to magnetize the magnetization free layer C14. Here, the magnetization occurring in the magnetization free layer C14 is parallel to the magnetized direction M of the magnetization fixed layer C16, that is, a magnetization parallel to the polarized direction P of the signal light entering the magnetization free layer C14 through the polarizing plate 11. This causes a phase of the signal light to be delayed by a transverse Kerr effect during a process of transmission in the magnetization free layer C14.

Here, a phase modulation amount of the cell C is determined depending on a magnitude of the magnetization in the magnetization free layer C14. The magnitude of the magnetization in the magnetization free layer C14 is determined depending on a magnitude of the spin flow injected into the magnetization free layer C14. The magnitude of the spin flow injected into the magnetization free layer C14 is determined depending on the potential difference provided between the first electrode C13 and the second electrode C17. Thus, regulating the potential difference provided between the first electrode C13 and the second electrode C17 can regulate phase modulating of the cell C.

The setting of the phase modulation amount of each microcell C can be achieved by, for example, machine learning. A model used in the machine learning is, for example, a model to which a two-dimensional intensity distribution of the signal light input to the optical modulation element 11Ai is input, and from which the two-dimensional intensity distribution of the signal light output from the optical modulation element 11Ai is output, the model including the phase modulation amount of each microcell C as a parameter. Here, the two-dimensional intensity distribution of the signal light input to the optical modulation element 11Ai refers to a set of intensities of signal light beams input to microcells C that constitute the optical modulation element 11Ai. Further, the two-dimensional intensity distribution of the signal light output from the optical modulation element 11Ai refers to a set of intensities of signal light beams input to microcells C that constitute an optical modulation element 11Ai+1 which is disposed so as to follow the optical modulation element 11Ai or a set of intensities of signal light beams input to cells that constitute the two-dimensional image sensor which is disposed so as to follow the optical modulation element 11Ai.

[Recap]

One or more embodiments can also be summarized as follows:

An imaging device in accordance with one or more embodiments includes: an optical computing section configured to perform optical computing with respect to a first optical signal to generate a second optical signal including a feature amount extracted from the first optical signal; an image sensor configured to convert the second optical signal into a first electric signal; and an electric computing section configured to perform electric computing with respect to the first electric signal to generate a second electric signal. The present imaging device employs a configuration such that the electric computing section has a plurality of models for each generating the second electric signal from the first electric signal, and the second electric signal generated through the electric computing performed with respect to the first electric signal including one and the same piece of image information with use of each of the models includes different image information.

According to the above configuration, the present imaging device enables, through electric computing performed with respect to the first electric signal having one and the same piece of image information, the generation of second electric signals including respectively different pieces of image information.

An imaging device in accordance with one or more embodiments employs, in addition to the configuration of the imaging device described above, a configuration such that the optical computing section and the plurality of models are designed by machine leaning so that, in a case where electric computing has been performed with respect to the first electric signal with use of each of the models, the second electric signal indicative of a different image is generated.

According to the above configuration, it is possible to achieve the optical computing section and the plurality of models with use of machine learning.

An imaging device in accordance with one or more embodiments employs, in addition to the configuration of the imaging device described above, a configuration such that the electric computing section generates, from the first electric signal, the second electric signal with use of a model selected by a user from among the plurality of models.

According to the above configuration, it is possible to generate a second electric signal including image information which reflects an intension of the user.

An imaging device in accordance with one or more embodiments employs, in addition to the configuration of the imaging device described above, a configuration such that the second electric signal generated through the electric computing performed with respect to the first electric signal with use of each of the models indicates an image differing in angle of view.

In order to generate an electric signal including image information differing in angle of view, the conventional imaging device would need to, for the change of the angle of view, mechanically change a position of the lens included in the optical system, and capture an image of a subject again. According to the above configuration, it is possible to generate the second electric signal including image information differing in angle of view, without mechanically changing the position of the lens or capturing the image of the subject again. This makes it possible to accelerate the generation of the second electric signal.

An imaging device in accordance with one or more embodiments employs, in addition to the configuration of the imaging device described above, a configuration such that the second electric signal generated through the electric computing performed with respect to the first electric signal with use of each of the models includes image information differing in resolution.

In order to generate an electric signal including image information differing in resolution, the conventional imaging device would change a resolution, which is one of image capture conditions set in advance before an image capture, and then capture an image of a subject again. According to the above configuration, it is possible to generate, without changing the image capture condition or capturing an image of the subject again, the second electric signal including image information differing in resolution. This makes it possible to accelerate the generation of the second electric signal.

An imaging device in accordance with one or more embodiments employs, in addition to the configuration of the imaging device described above, a configuration such that the second electric signal generated through the electric computing performed with respect to the first electric signal with use of each of the models includes image information differing in focal depth.

In order to generate an electric signal including image information differing in focal depth, the conventional imaging device would need to, for the change of the focal depth, mechanically change a position of the lens included in the optical system and capture an image of a subject again. According to the above configuration, it is possible to generate, without mechanically changing the position of the lens or capturing the image of the object again, the second electric signal including image information differing in focal depth. This makes it possible to accelerate the generation of the second electric signal.

An imaging device in accordance with one or more embodiments employs, in addition to the configuration of the imaging device described above, a configuration such that the image sensor is disposed such that an image of a subject is not formed on a light receiving surface of the image sensor.

In a case where the image sensor is disposed so that an image of a subject is formed on a light receiving surface of the image sensor, one of directions included in an angle of view of the image sensor corresponds, on a one-to-one basis, to one of a plurality of pixels included in the image sensor and arranged in a matrix manner.

In contrast, according to the above configuration, the image of the subject is not formed on the light receiving surface of the image sensor. Therefore, one of the directions included in the angle of view of the image sensor corresponds, on a one-to-multiple basis to the plurality of pixels included in the image sensor and arranged in a matrix manner.

In a case where electric computing is performed with respect to the first electric signal to generate the second electric signal, it is preferable to use the first electric signal generated in the condition where the one of the directions corresponds to the plurality of pixels on the one-to-multiple basis. This is because the first electric signal generated in such a condition includes various types of information.

An imaging device in accordance with one or more embodiments employs, in addition to the configuration of the imaging device described above, a configuration such that the optical computing section includes at least one transmissive optical modulation element that is constituted by a plurality of microcells having respective thicknesses or respective refractive indexes which are set independently of each other, and a specific optical path on which the first optical signal travels passes the at least one transmissive optical modulation element included in the optical computing section.

According to the above configuration, it is possible to achieve the optical computing section of the imaging device with use of the transmissive optical modulation element. A plurality of microcells having respective thicknesses or respective refractive indexes which are set independently of each other are suitably used as the transmissive optical modulation element.

An imaging device in accordance with one or more embodiments employs, in addition to the configuration of the imaging device described above, a configuration such that the optical computing section includes at least one reflective optical modulation element and, a specific optical path on which the first optical signal travels is a zigzag optical path passing the at least one reflective optical modulation element included in the optical computing section.

According to the above configuration, it is possible to achieve the optical computing section of the imaging device with use of the reflective optical modulation element.

An imaging method in accordance with one or more embodiments includes: an optical computing step of performing optical computing with respect to a first optical signal to generate a second optical signal including a feature amount extracted from the first optical signal; a converting step of converting the second optical signal into a first electric signal; and an electric computing step of performing electric computing with respect to the first electric signal to generate a second electric signal. The present imaging method employs a configuration such that the electric computing step is achieved with use of a plurality of models for each generating the second electric signal from the first electric signal, and the second electric signal generated through the electric computing performed with respect to the first electric signal with use of each of the models includes different image information.

According to the above configuration, the present imaging method enables, through electric computing performed with respect to the first electric signal having the same image information, the generation of second electric signals including respectively different pieces of image information.

A method for producing the imaging device in accordance with one or more embodiments is a method for producing the imaging device described above, and includes a step of designing the optical computing section and the plurality of models by machine learning so that, in a case where electric computing has been performed with respect to the first electric signal with use of each of the models, the second electric signal including different image information is generated.

According to the above configuration, the present method for producing an imaging device brings about an effect similar to that of the imaging device in accordance with one or more embodiments. The present method for producing an imaging device also achieves an optical computing section and a plurality of models with use of machine learning.

Supplementary Note

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Imaging device
11, 11A Optical computing section 111, 112, 113, 114 Optical modulation element
11A1, 11A2, 11A3, 11A4 Optical modulation element
C Microcell
12 Image sensor
13 Electric computing section
L1 Optical signal (first optical signal)
L2 Optical signal (second optical signal)
E1 Electric signal (first electric signal)
E2 Electric signal (second electric signal)

The invention claimed is:

1. An imaging device comprising:
an optical computing section that receives a first optical signal and generates a second optical signal including a feature amount extracted from the first optical signal;
an image sensor that converts the second optical signal into a first electric signal including a piece of image information; and
a computer that receives the first electric signal and generates second electric signals using machine learning models, each of the second electric signals corresponding to a respective one of the machine learning models, wherein
each of the second electric signals, generated from the first electric signal including the same piece of image information, includes different image information, and
the optical computing section includes an optical modulation element constituted by microcells, wherein the microcells, each having an independently set phase modulation amount, are disposed in a single layer.

2. The imaging device according to claim 1, wherein the optical computing section and the machine learning models are designed by machine leaning such that each of the second electric signals is indicative of a different image.

3. The imaging device according to claim 1, wherein each of the second electric signals includes image information differing in angle of view.

4. The imaging device according to claim 1, wherein each of the second electric signals includes image information differing in resolution.

5. The imaging device according to claim 1, wherein each of the second electric signals includes image information differing in focal depth.

6. The imaging device according to claim 1, wherein the image sensor is disposed in the imaging device such that an image of a subject is not formed on a light receiving surface of the image sensor.

7. The imaging device according to claim 1, wherein
the optical modulation element is a transmissive optical modulation element, and
a specific optical path on which the first optical signal travels passes the transmissive optical modulation element.

8. The imaging device according to claim 1, wherein
the optical modulation element is a reflective optical modulation element, and
a specific optical path on which the first optical signal travels is a zigzag optical path passing the reflective optical modulation element.

9. A method for producing the imaging device according to claim 1 comprising:
designing the optical computing section and the machine learning models such that each of the second electric signals includes the different image information.

10. An imaging method comprising:
receiving a first optical signal and generating a second optical signal including a feature amount extracted from the first optical signal;
converting the second optical signal into a first electric signal;
receiving the first electric signal and generating second electric signals using machine learning models, each of the second electric signals corresponding to a respective one of the machine learning models; and
optical computing using an optical modulation element constituted by microcells, wherein
the microcells, each having an independently set phase modulation amount, are disposed in a single layer, and
each of the second electric signals, generated from the first electric signal, includes different image information.

* * * * *